United States Patent
Bachand et al.

(10) Patent No.: US 9,939,328 B2
(45) Date of Patent: Apr. 10, 2018

(54) SYSTEMS, APPARATUS, AND METHODS FOR TEMPERATURE DETECTION

(71) Applicant: QUALCOMM Incorporated, San Diego, CA (US)

(72) Inventors: Charles Keith Bachand, Raleigh, NC (US); Scott James Lemke, Cary, NC (US); Ambarish Mukund Sule, Cary, NC (US); Mohammad Ghasemazar, San Diego, CA (US); Osvaldo Franco, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 14/656,706

(22) Filed: Mar. 12, 2015

(65) Prior Publication Data
US 2016/0265982 A1    Sep. 15, 2016

(51) Int. Cl.
*G01K 1/02* (2006.01)
*G01K 3/00* (2006.01)

(52) U.S. Cl.
CPC ............ *G01K 1/026* (2013.01); *G01K 3/00* (2013.01)

(58) Field of Classification Search
CPC ................... G01K 1/026; G01K 3/00
See application file for complete search history.

(56) References Cited

U.S. PATENT DOCUMENTS

| 5,490,059 | A | * | 2/1996 | Mahalingaiah | ......... G06F 1/206 700/46 |
| 6,104,075 | A | * | 8/2000 | Karaki | ...................... G01K 7/01 257/417 |
| 6,809,914 | B2 | * | 10/2004 | Edmonds | ............... G11C 7/109 361/93.8 |
| 6,937,958 | B2 | * | 8/2005 | Gold | ....................... G06F 1/206 257/E23.08 |

(Continued)

FOREIGN PATENT DOCUMENTS

| CN | 201110787 Y | * | 9/2008 |
| CN | 202974475 U | | 6/2013 |

(Continued)

OTHER PUBLICATIONS

Zhang Y., et al., "Accurate Temperature Estimation Using Noisy Thermal Sensors for Gaussian and Non-Gaussian Cases," IEEE Transactions on Very Large Scale Integration (VLSI) Systems, 2011, vol. 19 (9), pp. 1617-1626.

*Primary Examiner* — Harshad R Patel
*Assistant Examiner* — Punam Roy
(74) *Attorney, Agent, or Firm* — Muncy, Geissler, Olds & Lowe, P.C.

(57) ABSTRACT

Some examples of the disclosure are directed to systems, apparatus, and methods for temperature detection using multiple temperature controllers each having distributed temperature sensors that allow reading multiple sensor outputs in parallel for a wide range of covered area. The temperature controller may also have logic to calculate a local temperature controller maximum temperature, a maxi- (Continued)

mum temperature of all sensors, provide software access to each sensor, easy software enablement through a software interface that allows access earlier than when chip operating system (OS) is booted, and the ability to enable and mask individual sensors or sensor groups through software.

17 Claims, 10 Drawing Sheets

(56) References Cited

U.S. PATENT DOCUMENTS

| | | | | |
|---|---|---|---|---|
| 6,996,491 | B2* | 2/2006 | Gold | G06F 1/206 374/178 |
| 7,149,645 | B2* | 12/2006 | Mangrulkar | G01K 7/42 374/E3.002 |
| 7,450,456 | B2* | 11/2008 | Jain | G11C 5/04 365/189.02 |
| 7,512,514 | B2 | 3/2009 | Duarte et al. | |
| 7,532,056 | B2* | 5/2009 | Seo | G01K 7/00 323/907 |
| 7,590,473 | B2* | 9/2009 | Wyatt | G11C 5/00 365/212 |
| 7,617,403 | B2* | 11/2009 | Capps, Jr. | G06F 1/206 700/12 |
| 7,777,554 | B2* | 8/2010 | Hirano | G01K 1/026 327/512 |
| 8,027,798 | B2 | 9/2011 | Johns et al. | |
| 8,184,422 | B2* | 5/2012 | Rotem | G06F 1/206 361/103 |
| 8,724,415 | B2* | 5/2014 | Kuroda | G11C 11/406 365/222 |
| 8,734,006 | B2 | 5/2014 | Crafts et al. | |
| 8,766,704 | B2* | 7/2014 | Takayanagi | G06F 1/206 327/513 |
| 8,928,394 | B2* | 1/2015 | Park | G11C 5/14 327/513 |
| 9,097,590 | B2* | 8/2015 | Johns | G01K 3/005 |
| 9,285,818 | B2* | 3/2016 | Rosik | G05F 3/02 |
| 9,370,170 | B2* | 6/2016 | Downing | A01K 29/005 |
| 2001/0021217 | A1* | 9/2001 | Gunther | G01K 7/015 374/178 |
| 2004/0199730 | A1* | 10/2004 | Eggers | G06F 1/206 711/154 |
| 2004/0264093 | A1* | 12/2004 | Boerstler | G01K 1/026 361/103 |
| 2006/0161373 | A1* | 7/2006 | Mangrulkar | G01K 7/42 702/130 |
| 2006/0190210 | A1* | 8/2006 | Mukherjee | G01K 1/026 702/130 |
| 2006/0265174 | A1* | 11/2006 | Doyle | G01K 1/026 702/130 |
| 2007/0211548 | A1* | 9/2007 | Jain | G11C 5/04 365/211 |
| 2008/0062216 | A1* | 3/2008 | Bergstedt | B41J 2/04563 347/17 |
| 2009/0021314 | A1* | 1/2009 | Boerstler | H03L 1/022 331/66 |
| 2010/0153954 | A1* | 6/2010 | Morrow | G06F 1/329 718/102 |
| 2010/0231382 | A1* | 9/2010 | Tayrani | G01D 21/00 340/539.27 |
| 2010/0250974 | A1* | 9/2010 | Ristic | G06F 1/3203 713/300 |
| 2010/0301332 | A1* | 12/2010 | Dibra | G01K 1/026 257/48 |
| 2011/0040517 | A1* | 2/2011 | Johns | G01K 3/005 702/130 |
| 2012/0217316 | A1* | 8/2012 | Byquist | G01K 7/42 236/1 C |
| 2014/0028377 | A1* | 1/2014 | Rosik | G05F 3/02 327/513 |
| 2016/0127061 | A1* | 5/2016 | Ghasemazar | H04H 20/38 718/102 |

FOREIGN PATENT DOCUMENTS

| | | | | |
|---|---|---|---|---|
| CN | 203643034 U | * | 6/2014 | |
| EP | 1056183 A2 | * | 11/2000 | H02J 7/0021 |

* cited by examiner

SYSTEMS, APPARATUS, AND METHODS FOR TEMPERATURE DETECTION

FIELD OF DISCLOSURE

This disclosure relates generally to temperature detection in semiconductors, and more specifically, but not exclusively, to distributed temperature detection in a semiconductor die.

BACKGROUND

As computing devices become more complex, the size and complexity of the semiconductor chips used in the computing devices are increasing, particularly the system on chip (SOC) type semiconductor chips. These types of chips have large areas and are more active or perform more functions. This creates temperature problems for the chips. The more active chips produce more heat and the larger area produces more temperature gradients across the large chips. These temperature gradients need to be monitored and addressed to prevent a degradation of the chip performance. Conventionally, a single temperature sensor was included in the semiconductor packaging to provide sensor data. However, the large area presents a challenge to adequately monitoring temperature gradients with individual sensors.

Accordingly, there are long-felt industry needs for methods that improve upon conventional methods including the improved methods and apparatus provided hereby.

The inventive features that are characteristic of the teachings, together with further features and advantages, are better understood from the detailed description and the accompanying figures. Each of the figures is provided for the purpose of illustration and description only, and does not limit the present teachings.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In some examples of the disclosure, the system, apparatus, and method includes a system on chip integrated circuit having: a plurality of first temperature sensors, each of the plurality of first temperature sensors configured to detect a first local temperature; a first temperature sensor controller coupled to the plurality of first temperature sensors, the first temperature sensor controller configured to receive the detected first local temperatures; a plurality of second temperature sensors, each of the plurality of second temperature sensors configured to detect a second local temperature; a second temperature sensor controller coupled to the plurality of second temperature sensors, the second temperature sensor controller configured to receive the detected second local temperatures; and a combiner coupled to the first temperature sensor controller and the second temperature sensor and configured to receive the detected first local temperatures and the detected second local temperatures in parallel.

In some examples of the disclosure, the system, apparatus, and method includes temperature detection system for use in a semiconductor device having: a plurality of first temperature sensors, each of the plurality of first temperature sensors configured to detect a first local temperature; a first temperature sensor controller coupled to the plurality of first temperature sensors, the first temperature sensor controller configured to receive the detected first local temperatures; a plurality of second temperature sensors, each of the plurality of second temperature sensors configured to detect a second local temperature; a second temperature sensor controller coupled to the plurality of second temperature sensors, the second temperature sensor controller configured to receive the detected second local temperatures; and a combiner coupled to the first temperature sensor controller and the second temperature sensor and configured to receive the detected first local temperatures and the detected second local temperatures in parallel.

In some examples of the disclosure, the system, apparatus, and method includes a
method of temperature detection for use in a system on chip device, including the steps of: detecting, by a plurality of first temperature sensors, a plurality of first local temperatures; detecting, by a plurality of second temperature sensors, a plurality of second local temperatures; and receiving, by a combiner, the detected plurality of first local temperatures and the detected plurality of second local temperatures in parallel.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
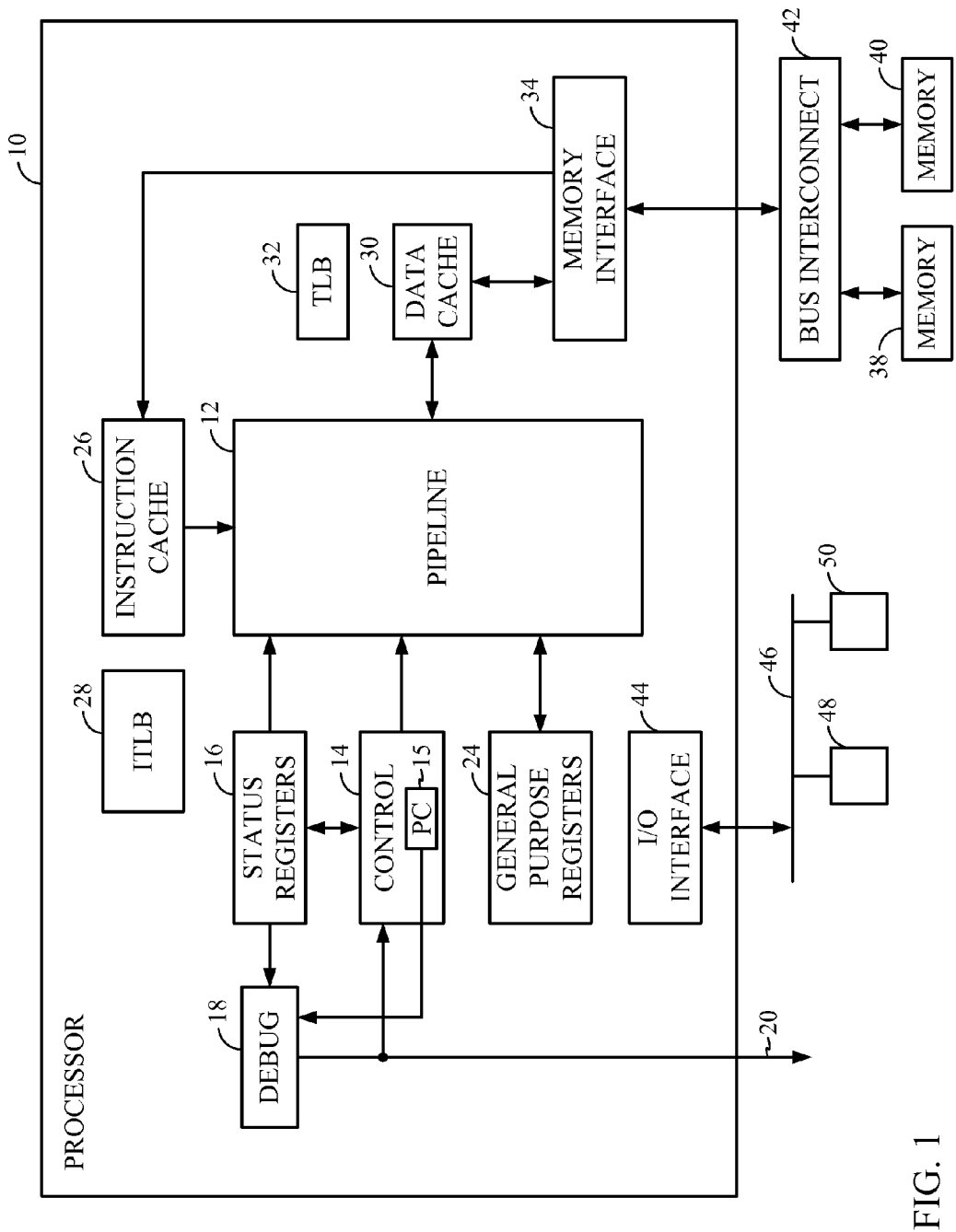
FIG. 1 illustrates an exemplary processor in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the long-felt industry needs, as well as other previously unidentified needs, and mitigate shortcomings of the conventional methods, apparatus, and systems. For instance, some examples of the disclosure are directed to systems, apparatus, and methods for temperature detection using 5 thermal control macros with 16 distributed sensors each may calculate the maximum temperature and output sensor readings as they are taken to put out on a sideband. These sidebands may be combined to put out a maximum temperature, PWM, or recent readings. A counter may provide a length of time to hold the value on GPIO outputs. This data may also be accessible on CSR, JTAG, debug trace, and include logic that allows operation during auto test pattern generation (ATPG). Controller logic combines parallel sensor blocks (2+) that have multiple distributed remote sensors to useable SOC output. The parallelism decreases time for complete read of sensors. The controller logic calculates local maximum temperatures per sensor block and these are combined for a maximum SOC temperature. The system provides software access to individual sensors through CSRs, JTAG pull, Debug trace, and IO. A "quickinit" JTAG enablement bit to enable temperature data quickly prior to OS boot (enables sensors, loads default values, choses proper clock). The controller logic operates during ATPG through a special fence mode and self-contained clocking. Sensors can be individually enabled so SOC output can consist of 1 to 80 sensors can be individually masked so bad or undesired sensors don't contribute.

Various aspects are disclosed in the following description and related drawings to show specific examples relating to the disclosure. Alternate examples will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and examples disclosed herein. The following definitions may be used throughout the disclosure:

JTAG—This "pull" interface may allow access to thermal temperature data through the JTAG port. The logic allows access to the chip maximum through JTAG and also within each TSENS controller. Individual sensor readings may also be accessed.

Parallel—This "push" interface may allow GPIO to show a parallel vector of the most recent temperature measurement as it occurs. It may also contains a "max" function that will instead output the maximum temperature from the last round of polls from the TSENS macro. The intended use is to create an ATE temperature profile to be replayed on a particular unit in characterization for active thermal control to the temperature in a sensor on the die and also provides a way to capture what the true gradients look like on the fly.

CSR— This "pull" method may be available by software and gives the max temperature for the die located in a CSR. In addition, the individual temperature sensor data is contained in CSR space in the TSENS controller.

PWM—This push interface takes the max temperature and creates a proportional duty cycle for use as an interface to an active thermal control mechanism or data recording device.

Debug trace—The parallel interface may be used to provide the data stream as input to the performance monitoring and diagnostics architecture including trace and triggering. This may be used in a system level test in debug to evaluate if temperature had a role in a failure or to see how temperature changes during a software run.

SPI— The serial peripheral interface (SPI) or similar interface allows a board level controller to obtain access to the temperature data collected by the distributed thermal network and max value. This may allowing external software access to the CSRs with Max and the CSRs within the tsens_controller.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element. Coupling and/or connection between the elements can be physical, logical, or a combination thereof. As employed herein, elements can be "connected" or "coupled" together, for example, by using one or more wires, cables, and/or printed electrical connections, as well as by using electromagnetic energy. The electromagnetic energy can have wavelengths in the radio frequency region, the microwave region and/or the optical (both visible and invisible) region. These are several non-limiting and non-exhaustive examples.

It should be understood that the term "signal" can include any signal such as a data signal, audio signal, video signal, multimedia signal, analog signal, and/or digital signal. Information and signals can be represented using any of a variety of different technologies and techniques. For example, data, an instruction, a process step, a command, information, a signal, a bit, and/or a symbol described in this description can be represented by a voltage, a current, an electromagnetic wave, a magnetic field and/or particle, an optical field and/or particle, and any combination thereof.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements."

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

In this description, certain terminology is used to describe certain features. The term "mobile device" can describe, and is not limited to, a mobile phone, a mobile communication device, a pager, a personal digital assistant, a personal information manager, a mobile hand-held computer, a laptop computer, a wireless device, a wireless modem, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable. Also, examples of this disclosure are applicable to non-mobile computing devices, such as a server.

FIG. 1 depicts a functional block diagram of an exemplary processor 10, such as an ASIC 208 (see below) configured to incorporate features of the improved data decompression. Processor 10 executes instructions in an instruction execution pipeline 12 according to control logic 14. Control logic 14 maintains a Program Counter (PC) 15, and sets and clears bits in one or more status registers 16 to indicate, e.g., the current instruction set operating mode, information regarding the results of arithmetic operations and logical comparisons (zero, carry, equal, not equal), and the like. In some examples, pipeline 12 may be a superscalar design, with multiple, parallel pipelines. Pipeline 12 may also be referred to as an execution unit. A General Purpose Register (GPR) file 20 provides a list of general purpose registers 24 accessible by pipeline 12, and comprising the top of the memory hierarchy.

Processor 10, which executes instructions from at least two instruction sets in different instruction set operating modes, additionally includes a debug circuit 18, operative to compare, upon the execution of each instruction, at least a predetermined target instruction set operating mode to the current instruction set operating mode, and to provide an indication of a match between the two.

Pipeline 12 fetches instructions from an instruction cache (I-cache) 26, with memory address translation and permissions managed by an Instruction-side Translation Lookaside Buffer (ITLB) 28. Data is accessed from a data cache (D-cache) 30, with memory address translation and permissions managed by a main Translation Lookaside Buffer (TLB) 32. In various examples, ITLB 28 may comprise a copy of part of TLB 32. Alternatively, ITLB 28 and TLB 32 may be integrated. Similarly, in various examples of processor 10, I-cache 26 and D-cache 30 may be integrated, or unified. Further, I-cache 26 and D-cache 30 may be L1 caches. Misses in I-cache 26 and/or D-cache 30 cause an access to main (off-chip) memory 38, 40 by a memory interface 34. Memory interface 34 may be a master input to a bus interconnect 42 implementing a shared bus to one or more memory devices 38, 40 that may incorporate the improved data decompression in accordance with some examples of the disclosure. Additional master devices (not shown) may additionally connect to bus interconnect 42.

Processor 10 may include input/output (I/O) interface 44, which may be a master device on a peripheral bus, across which I/O interface 44 may access various peripheral devices 48, 50 via bus 46. Those of skill in the art will recognize that numerous variations of processor 10 are possible. For example, processor 10 may include a second-level (L2) cache for either or both I and D caches 26, 30. In addition, one or more of the functional blocks depicted in processor 10 may be omitted from a particular example. Other functional blocks that may reside in processor 10, such as an instruction pre-decoder, branch target address cache, and the like are not germane to a description of the present disclosure, and are omitted for clarity.

Figure 2:
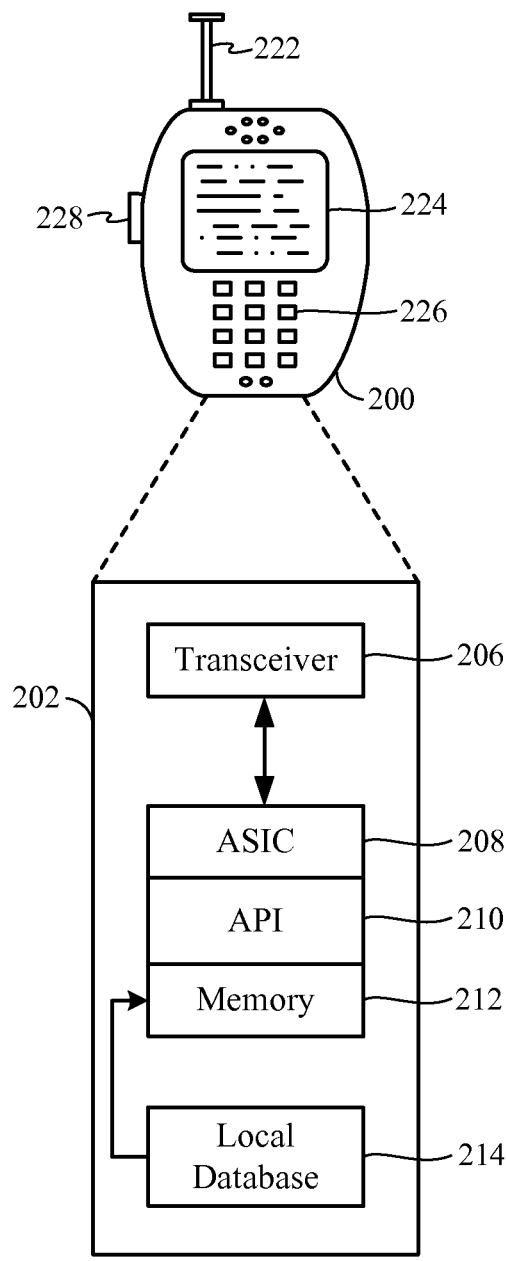
FIG. 2 illustrates exemplary user equipment (UE) in accordance with some examples of the disclosure.

Referring to FIG. 2, a system 100 that includes a UE 200, (here a wireless device), such as a cellular telephone, which has a platform 202 that can receive and execute software applications, data and/or commands transmitted from a radio access network (RAN) that may ultimately come from a core network, the Internet and/or other remote servers and networks. Platform 202 can include transceiver 206 operably coupled to an application specific integrated circuit ("ASIC" 208), or other processor, microprocessor, logic circuit, or other data processing device. ASIC 208 or other processor executes the application programming interface ("API") 210 layer that interfaces with any resident programs in memory 212 of the wireless device. Memory 212 can be comprised of read-only or random-access memory (RAM and ROM), EEPROM, flash cards, or any memory common to computer platforms. Platform 202 also can include local database 214 that can hold applications not actively used in memory 212. Local database 214 is typically a flash memory cell, but can be any secondary storage device as known in the art, such as magnetic media, EEPROM, optical media, tape, soft or hard disk, or the like. Internal platform 202 components can also be operably coupled to external devices such as antenna 222, display 224, push-to-talk button 228 and keypad 226 among other components, as is known in the art.

Accordingly, an example of the disclosure can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of UE 200 in FIG. 2 are to be considered merely illustrative and the disclosure is not limited to the illustrated features or arrangement.

The wireless communication between UE 200 and the RAN can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE) or other protocols that may be used in a wireless communications network or a data communications network. Accordingly, the illustrations provided herein are not intended to limit the examples of the disclosure and are merely to aid in the description of aspects of examples of the disclosure.

Figure 3:
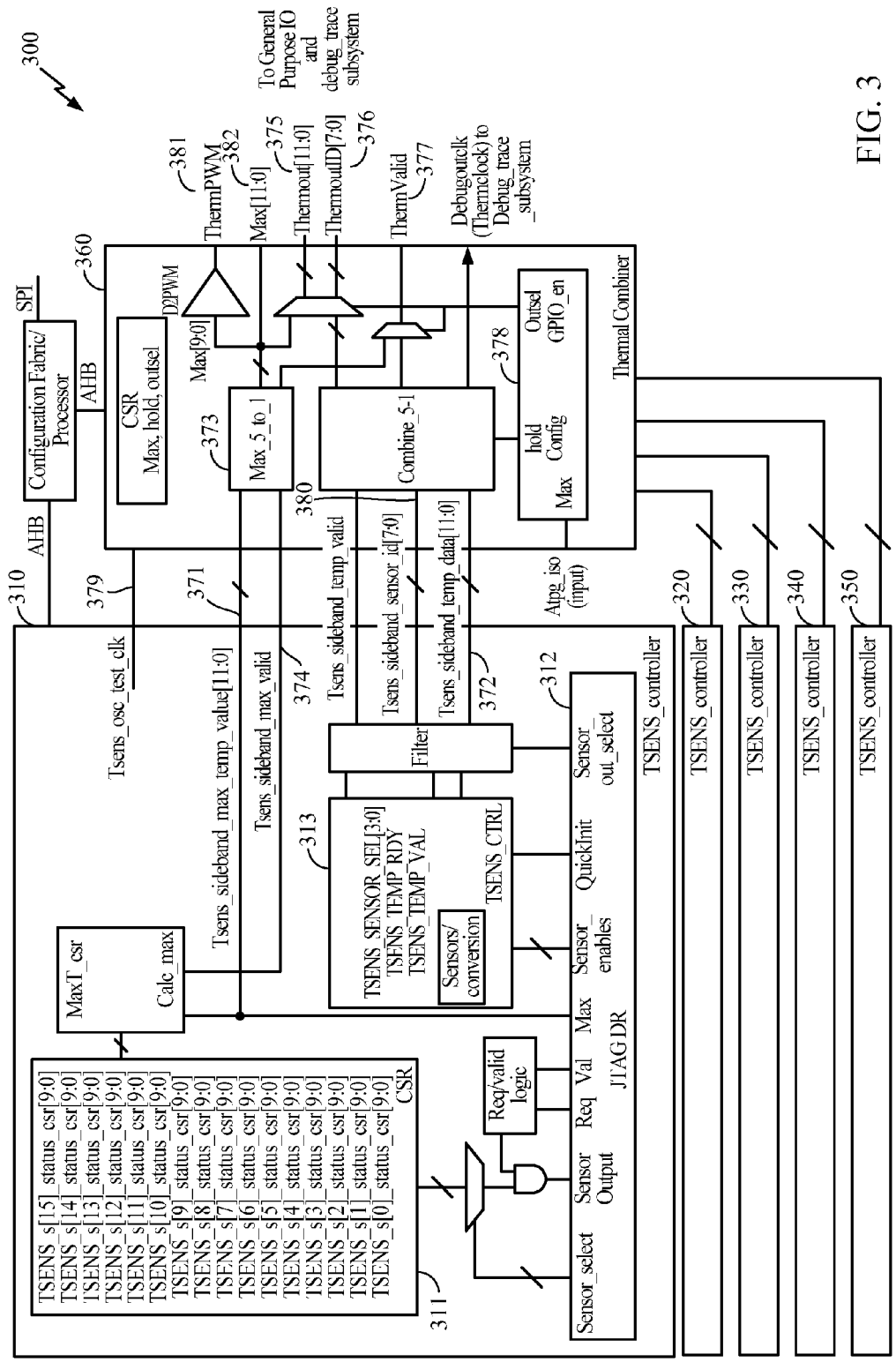
FIG. 3 illustrates an exemplary multiple temperature sensor controllers in accordance with some examples of the disclosure.

FIG. 3 illustrates an exemplary multiple temperature sensor controllers in accordance with some examples of the disclosure. As shown in FIG. 3, a temperature controller system 300 may include a first temperature sensor controller 310, a second temperature sensor controller 320, a third temperature sensor controller 330, a fourth temperature sensor controller 340, a fifth temperature sensor controller 350, and a thermal data concentrator or combiner 360 coupled to the temperature sensor controllers 310-350 to receive temperature data. Each temperature sensor controller (TSENS_controller) may be integrated into a semiconductor die or chip (not shown) and may be coupled to a local analog temperature sensor and fifteen remote analog temperature sensors for receiving analog temperature sensor data. Although this example describes five temperature sensor controllers with one local and fifteen remote sensors, it should be understood that more or less controllers or sensors may be used. Each temperature sensor controller may contain a plurality of components such as a CSR 311, a JTAG data register (DR) 312, and a sensor controller 313. The various components and operation of the temperature sensor controller will now be described with reference to the various pins and ports listed in the following table where N is the number of temperature sensor controllers:

TABLE 1

| Port | O | Description |
| --- | --- | --- |
| tsens_sideband_max_temp[N:0][11:0] | | The 12 bit signed maximum temperature from the last round of sensing for N instances of tsens_controller. Note that this is a standalone value and does not get read with tsens_sideband_sensor_id or tsens_sideband_temp_data. It is valid when the tsens_sideband_max_valid signal is asserted. |
| tsens_sideband_sensor_id[N:0][7:0] | | A 4 (lower) bit representation of the sensor from N tsens_controller instances. Each tsens_controller takes in a value from 1 local and 15 remote sensors for a total of 16 sensors. This input represents the sensor being reported in the Value input. In addition it may contain 4 bits (upper) to indicate which tsens_controller instance the data is coming from. May be used in conjunction with tsens_sideband_temp_data. |
| tsens_sideband_temp_data[N:0][11:0] | | The 12 bit signed value (or 10 bit unsigned raw code) representing a temperature reading from one of N instances of tsens_controller. This value may be associated with the tsens_sideband_sensor_id and can be read at the time of the tsens_sideband_temp_valid signal. |
| tsens_sideband_temp_valid[N:0] | | This signal from N instances of tsens_controller indicates that the tsens_sideband_temp_data value is valid |
| tsens_sideband_max_valid[N:0] | | This signal from N instances of tsens_controller indicates that the tsens_sideband_max_temp is valid. |
| Thermout[11:0] | | 12 bit output that contains either the max or a recent temperature sensor reading |
| ThermoutID[7:0] | | A number representing which sensor the Thermout[11:0] reading corresponds to the sensor being output. |

TABLE 1-continued

| Port | O | Description |
|---|---|---|
| ThermValid | | This pulses when the Thermout and ThermoutID change (or if Max is selected, when Max is updated). |
| Therm_PWM | | PWM output representation of the maximum temperature |
| JTAG (multiple pins) | /O | Data register |
| AHB interface | /O | Example AMBA (Advanced Microcontroller Bus Architecture) high performance bus interface that allows access to CSR register containing Max |
| tsens_osc_test_clk[N:0] | | Self-contained RO clock from each instance of N tsens_controller. |
| ATPG_iso | | Isolate from ATPG |
| XO | | External Crystal Oscillator Clock |
| Debugoutclk | | Output clock for data logging |
| outsel | | select max vs data on output |

The temperature controller system 300 logic will take outputs from the TSENS controllers 310-350 (N=5 in this example) and combine and format to support ATE and debug interfaces. For external thermal control and maximum temperature monitoring, a logic block 373 may take the maximum temperature from the N tsens_controller blocks and calculate the maximum temperature for the chip. The maximum output from the tsens_controller blocks may come on the Tsens_sideband_max_temp_value[11:0] 371 inputs from each tsens_controller. It may be a 12 bit signed number or a 10 bit output code from an ADC. The output may go to a mux to general purpose JO pins that may choose between the combined current sensor readings Tsens_sideband_temp_data [N:0][11:0] 372 and MAX [11:0] 382.

The maximum temperature may change when a new value is calculated based on a change from a TSENS controller. When this data changes, the valid bit will pulse low during the transition and then return to valid. This may prevent a tester asynchronously sampling a bad value by qualifying with valid. The maximum temperature may also go to a PWM converter to produce a duty cycle representation of the maximum temperature to directly tie to thermal control. The PWM at the end of putting out 1 period will take the current value on the max temperature. This logic is synchronous to the max calculation.

There will be N number of tsens_sideband_max_temp [11:0] 371 inputs and the block (max_N_to_1) 373 will sample the tsens_sideband_max_temp[11:0] 371 output of each tsens_controller when the tsens_sideband_max_valid 374 input is asserted. These values will be changing every 1 measurement period at a minimum if one sensor is enabled up to 16 measurement periods or more if all sensors within a tsens_controller are enabled. The tsens_sideband_max_temp[11:0] 371 and tsens_sideband_max_valid 374 signals are asynchronous from each tsens_controller. These values should be registered as they are received with the newer value replacing the older value. Then the block 360 will calculate and output the maximum of the maximum temperatures combinationally. When a new maximum value is calculated (which happens whenever a new temperature value is received), the ThermValid output should also be de-asserted for the transition and reasserted once the max temperature is stable. This is going to the GPIO output based on the mux selection. The maximum value should also be stored in a CSR 311 and have the ability to be captured in a JTAG JDR register 312. In certain circumstances, a temperature should be held (1) only for those tsens_controllers that are actively putting out a value and (2) only until the high sensor gets its next reading where Max would be recalculated based on the last readings from the other registers if it is no longer highest.

Thermout 375, ThermoutID 376 with Therm_Valid_output 377 reflect each thermal sensor reading in real time pushed to GPIO or debug trace in sensor output mode. Each reading from each tsens_controller comes every measurement period. These inputs are asynchronous to each other as they are generated on a ring oscillator clock coming from inside TSENS. As a new reading is presented at the input of the block 360, it is captured and output to general purpose IO or debug_trace system. As multiple readings coming into the block are possible at the same time, they should be captured into a register or FIFO which will then output the value to the ThermOut 375 and ThermoutID 376 outputs along with ThermValid 377 indicating a stable temperature. (The OutselJDR 378 choses ThermOut 375, ThermoutID 376, and ThermValid 377 from this block 360 over the max block).

Because it is possible to get 5 temperatures at the same time and it is desirable to push all out in a way they can be sampled properly, there is a JTAG DR field called "hold" that will give a minimum count to hold the value at the external pins. That way an external part or system can easier meet its hold times. Values should not be allowed to exceed the measurement period divided by the number of tsens_controllers to avoid an overflow error. This could count a selectable XO clock or the tsens_osc_test_clk 379 from the tsens_controller in the always on domain.

The ThermoutID 376 is derived from the tsens_controller id (4 bits) and the sensor (4 bits) which come from tsens_sideband_sensor_id[7:0] 380 In the event the chip is disabled or the mux select is set for maximum value, the TSENS_wrapper id should be set to different unused values.

The ThermPWM output 381 is a duty cycle representation of the maximum temperature and is the output of a counter based generator that uses Max(11:0) as the input. The PWM signal will be a 1.8V signal on the general purpose IO encoding 10 bits at an approximate frequency of 19.5 kHz. The temperature range of the 10 bits is −204 C to 204 C (with 0 being 10'b1000000000). The PWM is generated on an oscillator running between 19-33 MHz and is implemented as a counter that will be one if the count is below the temperature code and low if it is above.

The 10 bits are derived from a 12 bit signed number representing temperature in Centigrade*10. (i.e. if you lock to the frequency of the PWM and sample to get the 10 bit output, you can multiply the 10 bit number by 4, flip bit 12, and divide by 10 to get the temperature in C.) Alternatively, there may be a mode to divide the PWM signal by 16 to decrease its speed at the request of a test component.

In some examples, there are two JTAG registers related to the TSENS logic that may use bits as follows:

TABLE 2

| Bits | Field | Description |
| --- | --- | --- |
| 0 | Bypass | Override csr value for HOLD, Rawdata, and pwmdiv16 |
| 1 | Outsel (Read/Write) | Selects between max output or current sensor reading to bring to IO Max = 0, combiner = 1 |
| 11:2 | Hold (Read/Write) | Hold a value at the general purpose IO output for this number of clocks (xo or tsens_osc_test_clks) |
| 12 | Rawdata (Read/Write) | Selects that input is 12 bit signed number (=0) vs a 10 bit ADC code (=1). This results in adding 12'h800 to the input resulting in a linear range and direct comparison |
| 13 | Pwmdiv16 (Read/Write) | PWM output frequency will be divided by 16 if enabed slowing it down. |
| 14 | Bypass | Override csr value for spl_cond, clksel, and reset |
| 17:15 | Spl_cond | Spl_cond determines enables an ouput group. 0: pwm 1: thermdata 2: thermid |
| 20:18 | Clksel | Selects between a particular Therm_controller's clock and xo clock for the combiner logic |
| 21 | Reset | Resets the therm combiner logic |
| 11:0 | Max | This is a JTAG register that contains the max value calculated by the combiner |

The N tsens controllers send through the sideband the max temperature and the individual controller information. This comes separately as 12 bit signed numbers or as 10 bit codes. The thermal combiner 360 needs to be able to deal with both sets of numbers. To do this, we are adding 2^12 to the signed number which allows an unsigned comparison through the combinational max logic and also gives a linear response across the temperature range.

The ATPG mode logic should operate during ATPG mode and be fenced appropriately. This function will be done using the design for test (DFT) tool to create specific ATPG "modes" that allow the ATPG tool to include or not include this logic for ATPG. When the logic is excluded, it should operate off of a ring oscillator clock provided by one of the tsens_controllers, which is also excluded from ATPG. During ATPG mode, the TSENS_controller 300,320,330,340, 350 and combiner logic 360 is bypassed and the output signals are sent directly to the output pads using the scan channels. For fencing, the fence occurs at the JTAG data register and not the CSR. To fence, the control JTAG data register may be set. CSRs must be restored afterwards to continue in normal operating mode.

A mechanism may be provided to allow the current reading to remain for a programmable number of clock cycles before the next value is output. This should be set so that the ATE can reliably read the value along with the valid bit rising edge. Care must be taken to not set this number too high because combiner values could potentially be lost.

Figure 4:
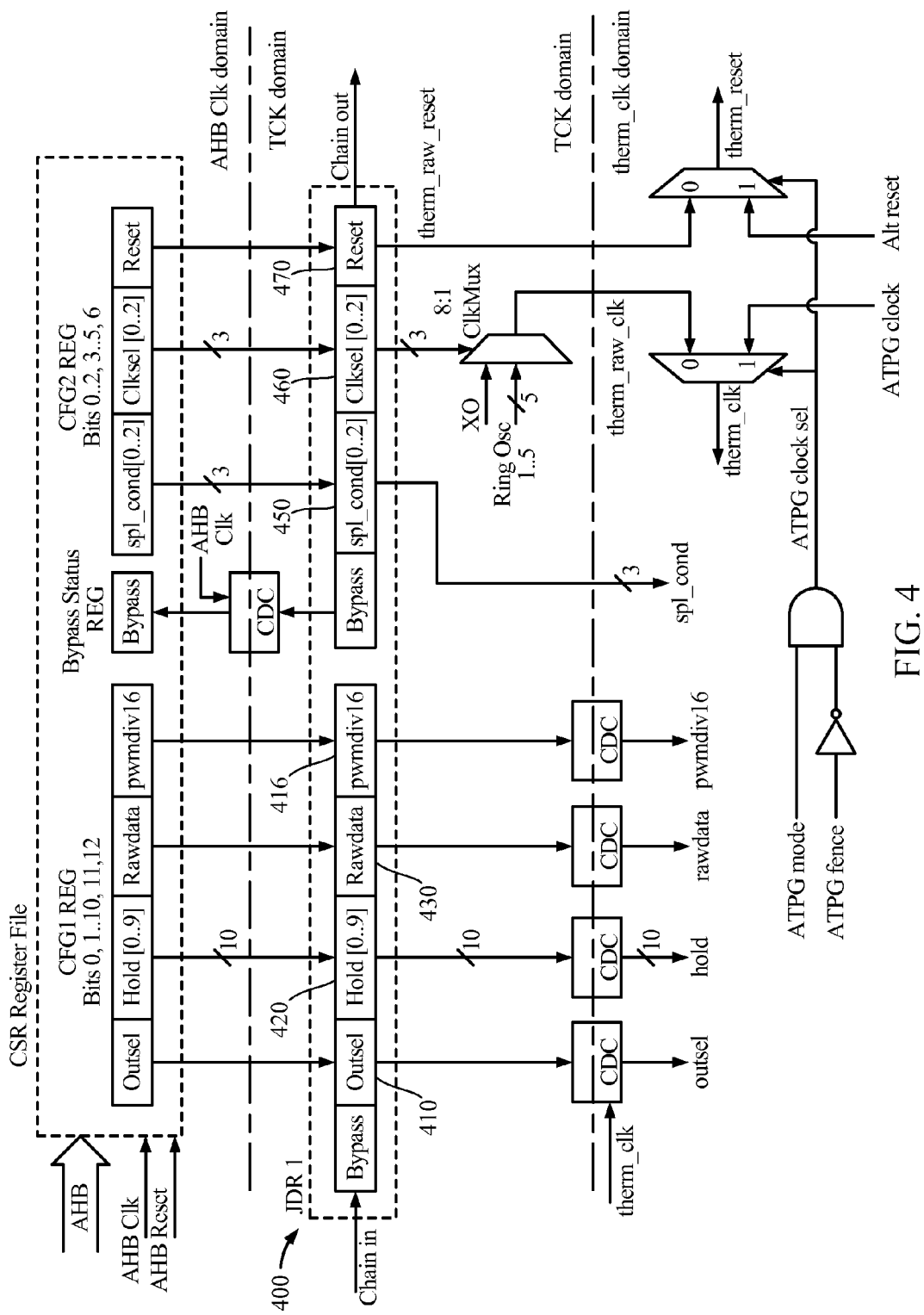
FIG. 4 illustrates an exemplary JTAG data register (JDR) (IEEE 1149) interface in accordance with some examples of the disclosure.
Figure 5:
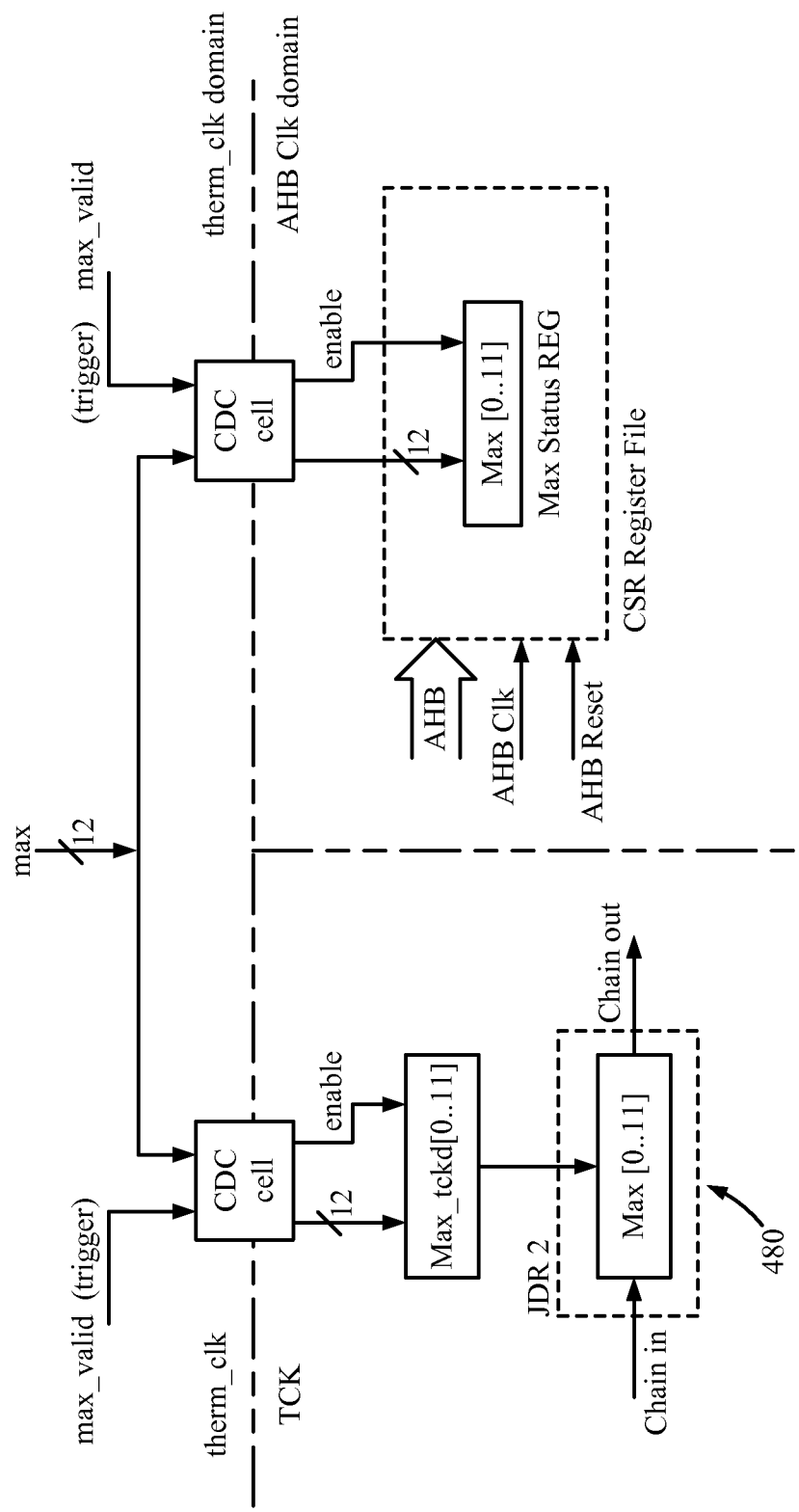
FIG. 5 illustrates an exemplary circuit for communicating values in a Control Status Register (CSR) and a JDR in accordance with some examples of the disclosure.

FIGS. 4 and 5 illustrate an exemplary JTAG data register (JDR) interface in accordance with some examples of the disclosure. As shown in FIGS. 4 and 5, the JDR interface 400 may be used to override the values in CSR. Outset 410 selects whether the output of the combiner is max vs. data on the fly. Hold 420 tells the max or on the fly data how many clocks to maintain the current output before changing. Rawdata 430 selects between 12 bit signed input from TSENS and 10 bit unsigned ADC codes (the raw data). Pwmdiv16 440 divides the clock by 16 to the pwm circuit to slow it down. SPL_cond 450 is used to select what is output on the parallel GPIOs—PWM, data, sensor ID. Clksel 460 selects which clock to take—a ring osc from one of the sensors or xo. Reset 470 may be used to reset this circuitry. It should be understood that during ATPG fence mode, the JTAG chain must be used since AHBclk is not excluded from test. FIG. 5 shows a logic diagram for a second JDR 480.

Figure 6:
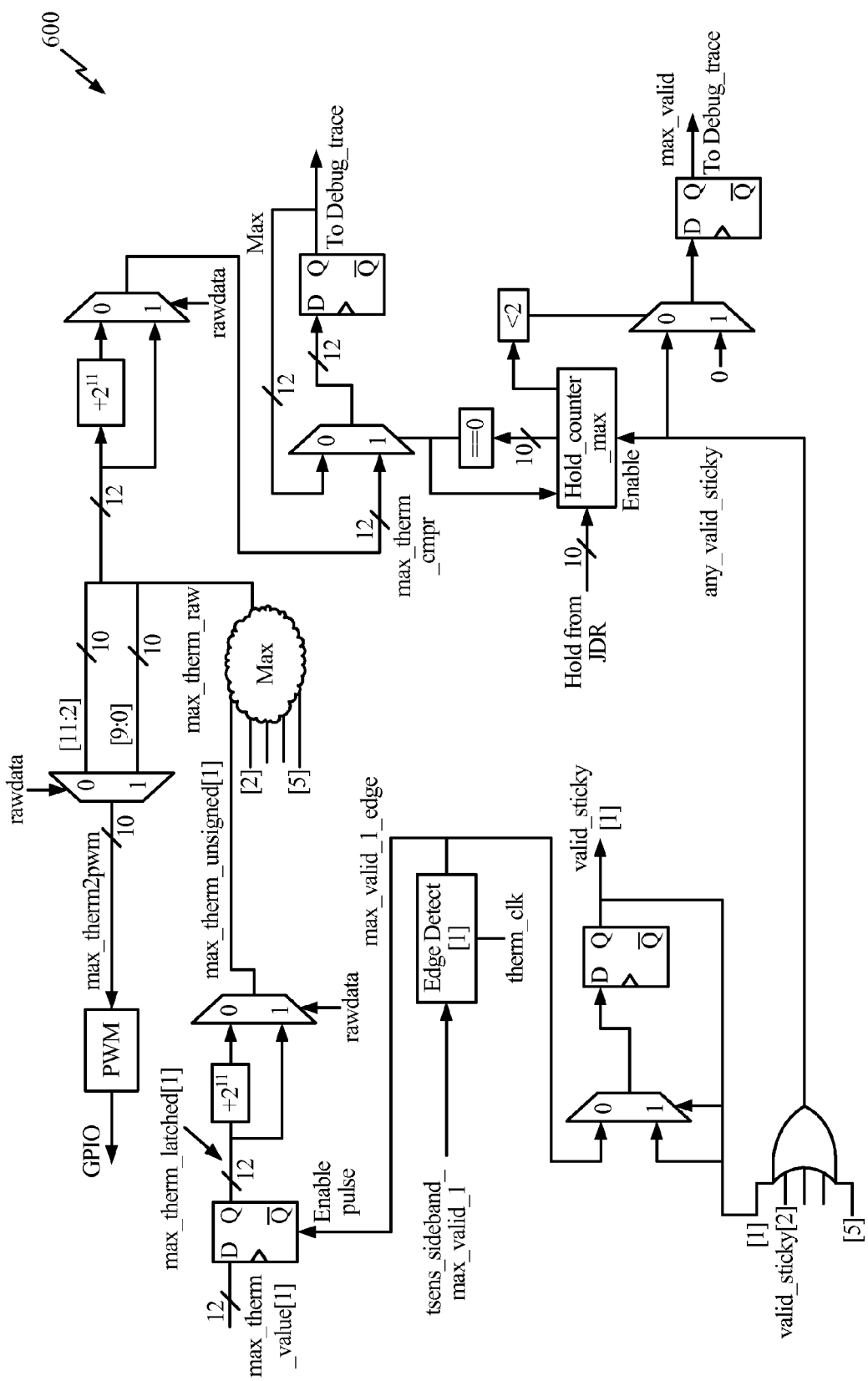
FIG. 6 illustrates an exemplary logic circuit for calculating maximum temperature values from temperature sensor inputs in accordance with some examples of the disclosure.

FIG. 6 illustrates an exemplary logic circuit for calculating maximum temperature values from temperature sensor inputs in accordance with some examples of the disclosure. As shown in FIG. 6, the thermvalidmax logic 600 calculates the max data from the various TSENS sensors. The edge detect logic looks at when the valid bit comes from the TSENS blocks. When this valid bit comes, the new thermal data gets latched. There is an offset added in the case of signed numbers coming in or no offset in the case of raw 10 bit ADC codes. At the output of the mux, the max gets generated through combinational logic also including the inputs from other sensors. This max temperature gets sampled by the PWM logic which takes the 12 bits to 10 or uses the max ADC code based on raw data. The max data also goes to the debug_trace system and to pins. A new value is sampled when the hold counter gets to 0.

Figure 7:
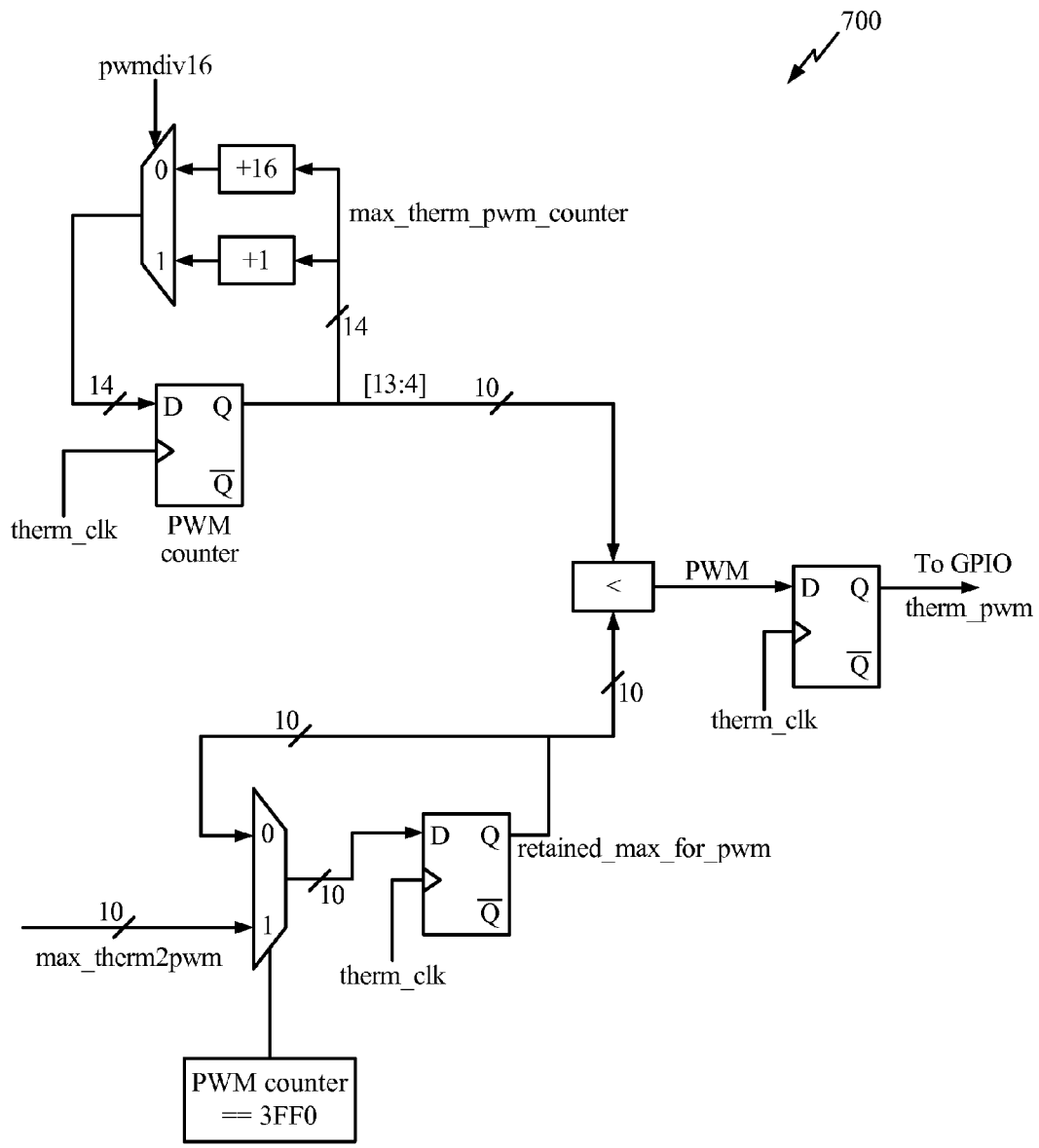
FIG. 7 illustrates an exemplary logic circuit for implementing a pulse width modulation (PWM) interface in accordance with some examples of the disclosure.

FIG. 7 illustrates an exemplary logic circuit for implementing a PWM interface in accordance with some examples of the disclosure. As shown in FIG. 7, the PWM logic 700 implements the PWM. The PWM is always valid once the first data starts. It should be understood that it does not shut off. Also note that the valid pin will go low whenever the sideband GPIOs change, but this does not negate the PWM validity. There is a divide by 16 that slows down the clock selected by a CSR/JDR bit—but this is optional. The PWM has a 14 bit counter. In non-div16 mode, the upper 10 bits of the counter are compared against the current maximum and the output is high when it is below the max and 16 is added (i.e. bits 3:0 are never used). In divide by 16 mode, the counter counts from bit 0 and still compares the upper 10 bits. The period is 2^10*therm_clk period.

Figure 8:
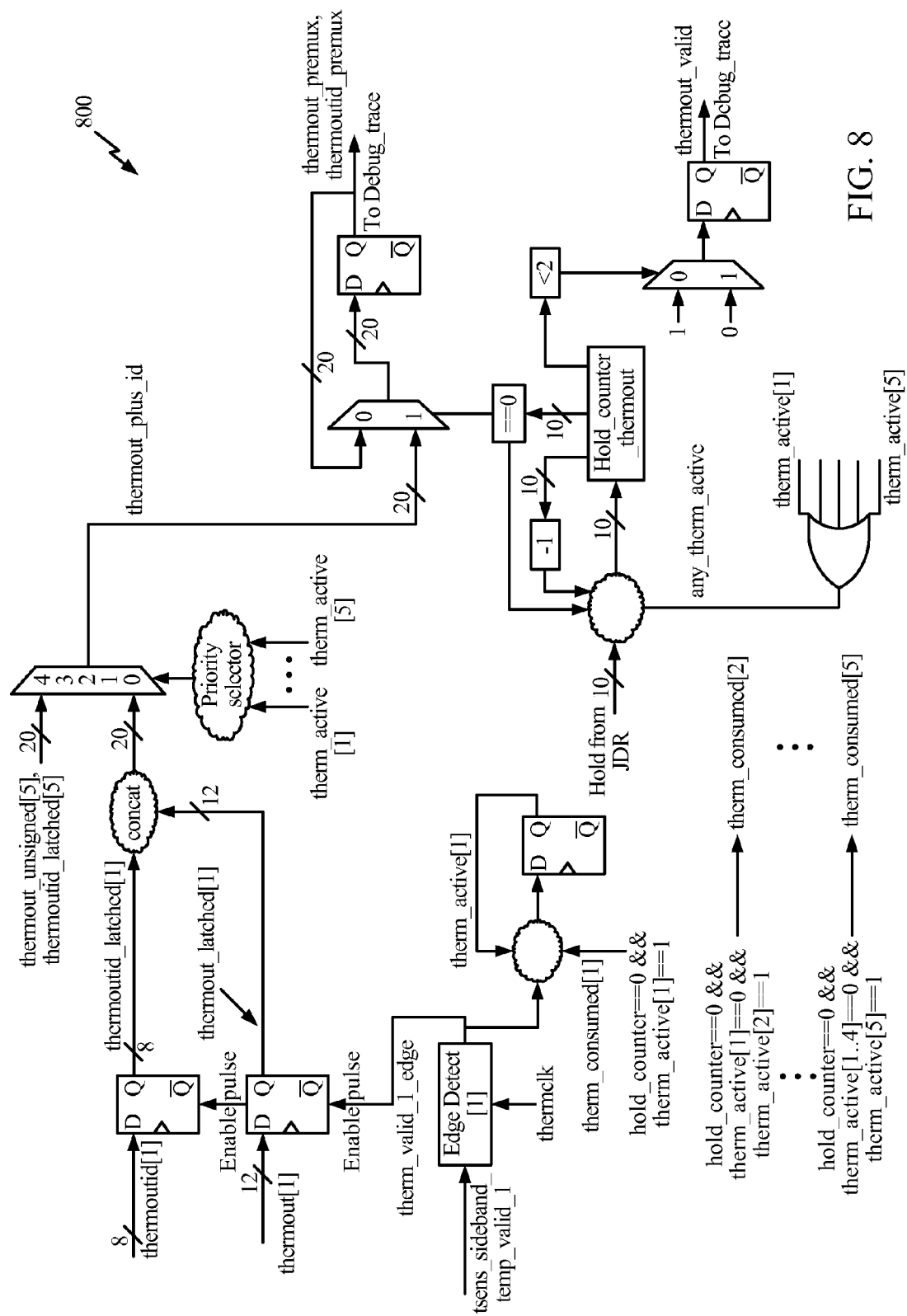
FIG. 8 illustrates an exemplary logic circuit for outputting raw temperature data and sensor ID in accordance with some examples of the disclosure.

FIG. 8 illustrates an exemplary logic circuit for outputting raw temperature data and ID in accordance with some examples of the disclosure. As shown in FIG. 8, the thermout logic 800 illustrates raw thermal data and ID output. The logic 800 starts with taking the data from the TSENS macros and when the valid bit changes, the TSENS data output and ID output are latched. In addition, there is a therm_active signal that indicate that there is a new value that needs to be output to the GPIO. There is a priority selector which manages the pending signals and selects which data and id bits get output to the gpio. The GPIO then will hold the value for the length of time the hold counter counts down.

Figure 9:
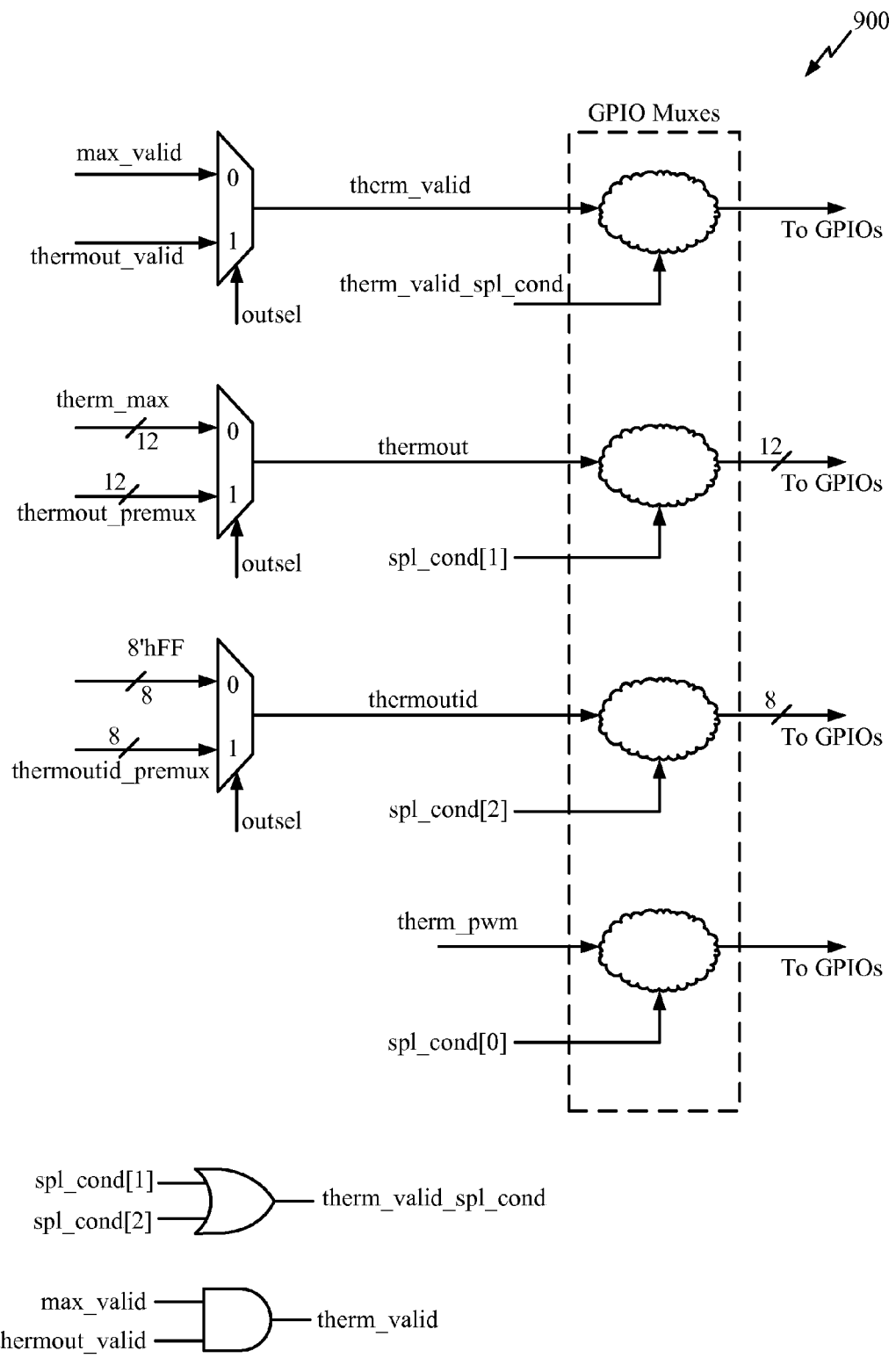
FIG. 9 illustrates an exemplary logic circuit for output selection in accordance with some examples of the disclosure.

FIG. 9 illustrates an exemplary logic circuit for output selection in accordance with some examples of the disclosure. As shown in FIG. 9, the outsel logic 900 shows the output selection choosing between the max and the raw output data based on outsel CSR/JDR. The special condition is based on the special condition CSR/JDR registers. The PWM has its own special condition. Data can go out with its special condition, which is available for the max function where ID isn't interesting. If ID is in the picture or alone, it has its special condition. Valid will be active if either ID or data is enabled. If either max or thermout is invalid, the debug_trace system will get an invalid indication.

Figure 10:
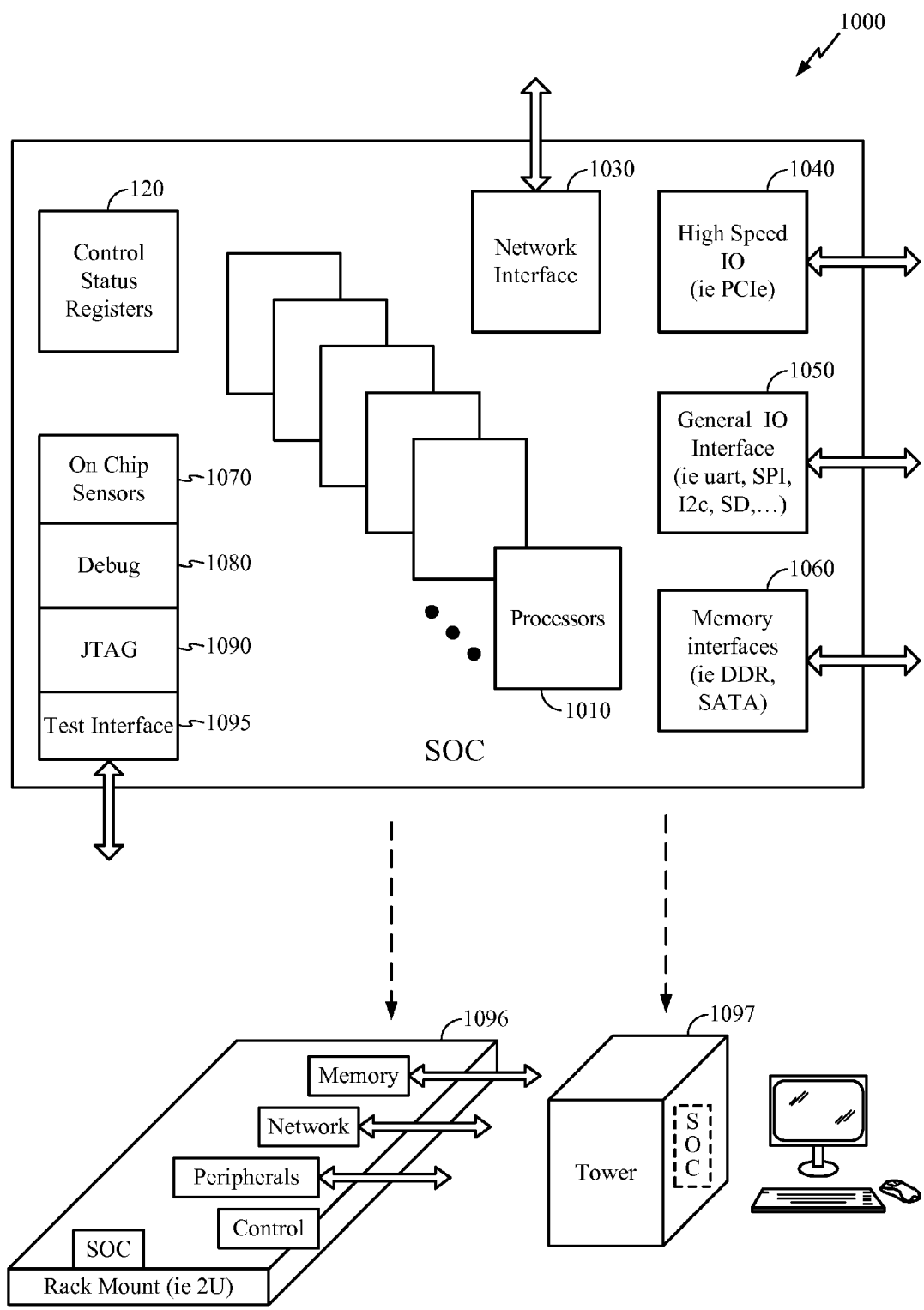
FIG. 10 illustrates an exemplary SoC for use in a desktop computing device in accordance with some examples of the disclosure.

FIG. 10 illustrates an exemplary SoC for use in a desktop computing device in accordance with some examples of the disclosure. As shown in FIG. 10, a SoC 1000 may include a plurality of processors 1010, a plurality of control status registers 1020, a network interface 1030, a high speed I/O interface 1040, a general I/O interface 1050, a plurality of memory interfaces 1060, on chip sensors 1070, debug logic 1080, a JTAG 1090, and a test interface 1095. The SoC 1000 may be integrated into a printed circuit board 1096 with other computing modules. The printed circuit board 1096 may be integrated into a server or desktop computing system 1097. It should be understood that other implementations of the examples shown herein are possible and may include more or less components than shown in these examples. Examples of the methods, apparatus, and systems described herein can be used in a number of applications. For instance, one of the maximum temperature or average temperature may be output from a distributed thermal sensor encoded to the PWM. Also, the temperature measurements may be output in real time (on the fly) to pins or a debug system from a combiner receiving the data from a distributed thermal system.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

The examples described above merely constitute an illustration of the principles of the present disclosure. It goes without saying that modifications and variations of the arrangements and details described herein will become apparent to other persons skilled in the art. Therefore, it is intended that the disclosure be restricted only by the scope of protection of the appended patent claims, rather than by the specific details presented on the basis of the description and the explanation of the examples herein.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Furthermore, although elements of the disclosure may be described or claimed in the singular, the plural is contemplated unless limitation to the singular is explicitly stated.

What is claimed is:

1. A system on chip integrated circuit, comprising:
    a plurality of first temperature sensors, each of the plurality of first temperature sensors configured to detect a first local temperature;
    a first temperature sensor controller coupled to the plurality of first temperature sensors, the first temperature sensor controller configured to receive the detected first local temperatures;
    a plurality of second temperature sensors, each of the plurality of second temperature sensors configured to detect a second local temperature;
    a second temperature sensor controller coupled to the plurality of second temperature sensors, the second temperature sensor controller configured to receive the detected second local temperatures; and
    a combiner coupled to the first temperature sensor controller and the second temperature sensor controller and configured to receive the detected first local temperatures and the detected second local temperatures in parallel and determine a maximum local temperature based on the detected first local temperatures and the detected second local temperatures;
    wherein the first temperature sensor controller is configured to calculate a first local temperature maximum; the second temperature sensor controller is configured to calculate a second local temperature maximum; and the combiner is configured to receive the first local temperature maximum and the second local temperature maximum in parallel and calculate the maximum local temperature based on the received first local temperature maximum and the received second local temperature maximum.

2. The system on chip integrated circuit of claim 1, wherein the first temperature sensor controller is configured to calculate a first local temperature average; the second temperature sensor controller is configured to calculate a second local temperature average; and the combiner is configured to receive the first local temperature average and the second local temperature average in parallel and calculate an average local temperature based on the received first local temperature average and the received second local temperature average.

3. The system on chip integrated circuit of claim 1, wherein the system on chip integrated circuit is integrated into a semiconductor device and is operable before an operating system for the semiconductor device is operable.

4. The system on chip integrated circuit of claim 1, wherein the first temperature sensor controller is configured to enable or disable each of the plurality of first temperature sensors individually and mask or unmask each of the detected first local temperatures individually; and wherein the second temperature sensor controller is configured to enable or disable each of the plurality of second temperature sensors individually and mask or unmask each of the detected second local temperatures individually.

5. The system on chip integrated circuit of claim 1, wherein the system on chip integrated circuit is operable during an automatic test generation pattern mode.

6. The system on chip integrated circuit of claim 1, further comprising:
    a plurality of third temperature sensors, each of the plurality of third temperature sensors configured to detect a third local temperature;
    a third temperature sensor controller coupled to the plurality of third temperature sensors, the third temperature sensor controller configured to receive the detected third local temperatures;
    a plurality of fourth temperature sensors, each of the plurality of fourth temperature sensors configured to detect a fourth local temperature;
    a fourth temperature sensor controller coupled to the plurality of fourth temperature sensors, the fourth temperature sensor controller configured to receive the detected fourth local temperatures;
    a plurality of fifth temperature sensors, each of the plurality of fifth temperature sensors configured to detect a fifth local temperature;
    a fifth temperature sensor controller coupled to the plurality of fifth temperature sensors, the fifth temperature sensor controller configured to receive the detected fifth local temperatures; and
    wherein the combiner is coupled to the third temperature sensor controller, the fourth temperature sensor controller, and the fifth temperature sensor controller and configured to receive the detected third local temperatures, the detected fourth local temperatures, and the detected fifth local temperatures in parallel.

7. The system on chip integrated circuit of claim 1, wherein the system on chip integrated circuit is integrated into one of a mobile phone, a mobile communication device, a pager, a personal digital assistant, a personal information manager, a mobile hand-held computer, a laptop computer, a server, a wireless device, or a wireless modem.

8. A temperature detection system for use in a semiconductor device, comprising:
    a plurality of first temperature sensors, each of the plurality of first temperature sensors configured to detect a first local temperature;
    a first temperature sensor controller coupled to the plurality of first temperature sensors, the first temperature sensor controller configured to receive the detected first local temperatures;
    a plurality of second temperature sensors, each of the plurality of second temperature sensors configured to detect a second local temperature;
    a second temperature sensor controller coupled to the plurality of second temperature sensors, the second temperature sensor controller configured to receive the detected second local temperatures; and
    a combiner coupled to the first temperature sensor controller and the second temperature sensor controller and configured to receive the detected first local temperatures and the detected second local temperatures in parallel and determine a maximum local temperature based on the detected first local temperatures and the detected second local temperatures;

wherein the first temperature sensor controller is configured to calculate a first local temperature maximum; the second temperature sensor controller is configured to calculate a second local temperature maximum; and the combiner is configured to receive the first local temperature maximum and the second local temperature maximum in parallel and calculate the maximum local temperature based on the received first local temperature maximum and the received second local temperature maximum.

9. The temperature detection system of claim 8, wherein the temperature detection system is operable before an operating system for the semiconductor device is operable.

10. The temperature detection system of claim 8, wherein the first temperature sensor controller is configured to enable or disable each of the plurality of first temperature sensors individually and mask or unmask each of the detected first local temperatures individually; and wherein the second temperature sensor controller is configured to enable or disable each of the plurality of second temperature sensors individually and mask or unmask each of the detected second local temperatures individually.

11. The temperature detection system of claim 8, wherein the temperature detection system is operable during an automatic test generation pattern mode.

12. The temperature detection system of claim 8, further comprising:
- a plurality of third temperature sensors, each of the plurality of third temperature sensors configured to detect a third local temperature;
- a third temperature sensor controller coupled to the plurality of third temperature sensors, the third temperature sensor controller configured to receive the detected third local temperatures;
- a plurality of fourth temperature sensors, each of the plurality of fourth temperature sensors configured to detect a fourth local temperature;
- a fourth temperature sensor controller coupled to the plurality of fourth temperature sensors, the fourth temperature sensor controller configured to receive the detected fourth local temperatures;
- a plurality of fifth temperature sensors, each of the plurality of fifth temperature sensors configured to detect a fifth local temperature;
- a fifth temperature sensor controller coupled to the plurality of fifth temperature sensors, the fifth temperature sensor controller configured to receive the detected fifth local temperatures; and
- wherein the combiner is coupled to the third temperature sensor controller, the fourth temperature sensor controller, and the fifth temperature sensor controller and configured to receive the detected third local temperatures, the detected fourth local temperatures, and the detected fifth local temperatures in parallel.

13. A method of temperature detection for use in a system on chip device, comprising:
- detecting, by a plurality of first temperature sensors, a plurality of first local temperatures;
- detecting, by a plurality of second temperature sensors, a plurality of second local temperatures;
- receiving, by a combiner, the detected plurality of first local temperatures and the detected plurality of second local temperatures in parallel;
- determining a maximum local temperature based on the detected first local temperatures and the detected second local temperatures;
- calculating a first local temperature maximum based on the detected plurality of first local temperatures;
- calculating a second local temperature maximum based on the detected plurality of second local temperatures;
- receiving, by the combiner, the calculated first local temperature maximum and the calculated second local temperature maximum in parallel; and
- calculating, by the combiner, the maximum local temperature based on the calculated first local temperature maximum and the calculated second local temperature maximum.

14. The temperature detection method of claim 13, wherein one of the detecting, receiving, or calculating is performed before an operating system for the system on chip device is operable.

15. The temperature detection method of claim 13, further comprising:
- calculating, by the combiner, an average local temperature based on the detected plurality of first local temperatures and the detected plurality of second local temperatures; and
- outputting one of the maximum local temperature or the average local temperature to a pulse width modulation logic.

16. The temperature detection method of claim 13, wherein the detected plurality of first local temperatures and the detected plurality of second local temperatures are output, by the combiner, in real time to one of a plurality of output pins or a debug system.

17. The temperature detection method of claim 13, further comprising:
- detecting, by a plurality of third temperature sensors, a plurality of third local temperatures;
- detecting, by a plurality of fourth temperature sensors, a plurality of fourth local temperatures;
- detecting, by a plurality of fifth temperature sensors, a plurality of fifth local temperatures; and
- receiving, by the combiner, the detected plurality of third local temperatures, the detected plurality of fourth local temperatures, and the detected plurality of fifth local temperatures in parallel.

* * * * *